(12) United States Patent
Yoon

(10) Patent No.: US 10,523,415 B2
(45) Date of Patent: Dec. 31, 2019

(54) METHOD FOR ESTIMATING TIMING OFFSET IN RECEIVER IN MOBILE COMMUNICATION SYSTEM AND APPARATUS FOR SAME

(71) Applicant: Samsung Electronics Co., Ltd, Gyeonggi-do (KR)

(72) Inventor: Yon-Woo Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 15/122,157

(22) PCT Filed: Feb. 17, 2015

(86) PCT No.: PCT/KR2015/001616
§ 371 (c)(1),
(2) Date: Aug. 26, 2016

(87) PCT Pub. No.: WO2015/130047
PCT Pub. Date: Sep. 3, 2015

(65) Prior Publication Data
US 2016/0373246 A1    Dec. 22, 2016

(30) Foreign Application Priority Data

Feb. 26, 2014 (KR) .......................... 10-2014-0022508

(51) Int. Cl.
*H04L 7/04*  (2006.01)
*H04L 25/02* (2006.01)
*H04W 56/00* (2009.01)

(52) U.S. Cl.
CPC .......... *H04L 7/042* (2013.01); *H04L 25/0202* (2013.01); *H04W 56/0035* (2013.01)

(58) Field of Classification Search
CPC ....... H04L 7/042; H04L 25/0202; H04L 5/12; H04W 56/0035
See application file for complete search history.

(56) References Cited

U.S. PATENT DOCUMENTS

2007/0182604 A1    8/2007  Aerts et al.
2008/0080636 A1    4/2008  Sung et al.
(Continued)

OTHER PUBLICATIONS

International Search Report dated May 11, 2015 in connection with International Application No. PCT/KR2015/001616, 5 pages.
(Continued)

*Primary Examiner* — Khaled M Kassim
*Assistant Examiner* — Syed Ali

(57) ABSTRACT

The present invention relates to a method for estimating timing offset of a first user in a receiver which supports a VAMOS technique and receives a burst through a wireless channel in a mobile communication system, the method comprising: determining a received signal matrix by using a plurality of reception training symbols included in the burst and located after predetermined numbers of symbols from the timing offset; determining LS channel estimation matrix in which the first user and a second user are combined, by using information on a transmission training symbol allocated to the second user and information on a transmission training symbol allocated to the first user; performing inner product calculation on the LS channel estimation matrix in which the first and second users are combined and on the received signal matrix so as to calculate a plurality of combined likelihood values; and selecting the timing offset so as to have the maximum value among the plurality of combined likelihood values.

15 Claims, 6 Drawing Sheets

(56) References Cited

U.S. PATENT DOCUMENTS

| | | | | |
|---|---|---|---|---|
| 2008/0285670 A1* | 11/2008 | Walton | ............... | H04B 7/022 |
| | | | | 375/260 |
| 2010/0067440 A1 | 3/2010 | Dick et al. | | |
| 2010/0081445 A1 | 4/2010 | Aghili et al. | | |
| 2011/0044299 A1 | 2/2011 | Spencer et al. | | |
| 2011/0082689 A1 | 4/2011 | Juncker et al. | | |
| 2012/0182913 A1* | 7/2012 | Kreuzer | ............... | H04W 28/06 |
| | | | | 370/311 |
| 2012/0220292 A1 | 8/2012 | Yu et al. | | |
| 2012/0244817 A1* | 9/2012 | Das | ............... | H04L 5/12 |
| | | | | 455/67.11 |
| 2012/0314687 A1 | 12/2012 | Choi et al. | | |
| 2013/0163443 A1 | 6/2013 | Liberg et al. | | |
| 2014/0010334 A1 | 1/2014 | Kotzsch | | |
| 2014/0119308 A1* | 5/2014 | Mochida | ............... | H04B 7/0854 |
| | | | | 370/329 |
| 2014/0185538 A1* | 7/2014 | Zhang | ............... | H04L 5/0044 |
| | | | | 370/329 |
| 2014/0219397 A1* | 8/2014 | Chen | ............... | H04L 27/16 |
| | | | | 375/329 |
| 2014/0341184 A1* | 11/2014 | Dhanda | ............... | H04W 72/048 |
| | | | | 370/331 |
| 2014/0355721 A1* | 12/2014 | Jacob | ............... | H04B 1/10 |
| | | | | 375/340 |

OTHER PUBLICATIONS

Written Opinion of the International Searching Authority dated May 11, 2015 in connection with International Application No. PCT/KR2015/001616, 6 pages.

Ericsson, "Evolution of GSM Voice", Ericsson White Paper, Jul. 2010, 11 pages.

Nokia Siemens Networks, "Doubling GSM Voice Capacity with the Orthogonal Sub Channel", Technology Brief V10, Oct. 23, 2013, 12 pages.

Rohde & Schwarz, "VAMOS Technology Introduction Application Note", Aug. 2010, 30 pages.

ESTI TR 145 914 V9.2.0, "Digital Cellular Telecommunications System (Phase 2+), Circuit Switched Voice Capacity Evolution for GSM/EDGE Radio Access Network (GERAN) (3GPP TR 45.914 version 9.2.0 Release 9)",k Jul. 2010, 321 pages.

\* cited by examiner

METHOD FOR ESTIMATING TIMING OFFSET IN RECEIVER IN MOBILE COMMUNICATION SYSTEM AND APPARATUS FOR SAME

CROSS-REFERENCE TO RELATED APPLICATION(S)

This application is a National Phase Entry of PCT International Application No. PCT/KR2015/001616, which was filed on Feb. 17, 2015, and claims a priority to Korean Patent Application No. 10-2014-0022508, which was filed on Feb. 26, 2014, the contents of which are incorporated herein by reference.

TECHNICAL FIELD

The present disclosure relates to a method and apparatus for estimating a timing offset of a receiver in a mobile communication system, and more particularly, to a method and apparatus for estimating a timing offset for Voice services over Adaptive Multi-user Channels on One Slot (VAMOS) where one transmission resource is allocated to two users in a Global System for Mobile Communications (GSM) system.

BACKGROUND

A Global System for Mobile Communications (GSM) system, which is a sort of mobile communication systems, is a personal portable communication system (or technology) widely used over the world, and is a communication system based on Time Division Multiple Access (TDMA).

FIG. 1 illustrates a baseband equivalent system model in a mobile communication system.

Referring to FIG. 1, in a GSM system, the baseband equivalent system model may include a digital transmitter (or a transmitting apparatus) 100, a wireless channel 110, and a receiver (or a receiving apparatus) 120.

The transmitter 100 generates and transmits a signal according to an Enhanced Data GSM Environment (EDGE) physical channel specification of GSM. In the transmitter 100, a random bit signal in which "0" and "1" are generated at the same probability, and the generated bit signal is mapped to 148 symbols after passing through channel coding and interleaving. The mapped symbols are modulated using Gaussian Minimum Shift Keying (GMSK) or eight Phase Shift Keying (8PSK) and then transmitted in a multi-frame or burst format through the wireless channel 110 from the transmitter 100.

The receiver 120 receives the signal transmitted from the transmitter 100 through the wireless channel 110.

GMSK, although being a nonlinear modulation scheme, may perform approximation into a linear-modulated signal. Thus, a signal sampled at intervals of $kT_S/N_S$ from a signal received by the receiver 120 through a frequency-selective channel may be expressed as follows:

$$y_k = e^{jk\nu} \sum_{i=0}^{N_S(L-1)} x_{k-i} e^{j(k-i)\theta/N_S} h_i + n_k \qquad \text{[Equation 1]}$$

wherein k indicates a time index, and i indicates a running index for summation. $x_k$ indicates a transmitted symbol at time k, and $n_k$ indicates a term in which an additive complex interference and a background noise at the time k are summed. $T_S$ indicates a symbol time of a unit symbol and equals 48/13 μsec (≈3.69 μsec), and $N_S$ indicates an oversampling rate (the number of times of sampling per unit symbol, which may have, for example, a value of "4"). A function $h_k$ of a physical channel having a length of $N_S(L-1)$ is a result including effects of transmit filtering at the transmitter 100, receive filtering at the receiver 120, and the frequency-selective physical channel at the wireless channel 110. L indicates a length of a channel to be estimated and may have, for example, a value of 7. θ indicates a symbol rotation phase that varies with a modulation scheme, and may have a value of π/2 for the GMSK modulation scheme and a value of 3π/8 for the 8PSK modulation scheme. ν(:nu) indicates a carrier frequency offset phase that is normalized to $1/T_S$.

FIG. 2 is a view for describing a burst received by a receiver as the concept of sampling time to describe the concept of timing offset estimation in a GSM system.

Referring to FIG. 2, for example, one burst 200 may include a total of 156 symbols. The 156 symbols may sequentially include 4 guard symbols 202, 3 tail symbols 206, 58 first encrypted symbols 210, 26 training sequence symbols 214, 216, 218, 58 second encrypted symbols 212, 3 tail symbols 208, and 4 guard symbols 204. Selectively, the 26 training sequence symbols may include 6 front training sequence symbols 214, 16 middle training sequence symbols 216, and 4 back training sequence symbols 218.

At reception reference sampling time, the receiver stores, in a burst buffer, samples corresponding to a total of the 156 symbols (i.e., 156*$N_S$ samples) including the guard symbols 202 before four symbols from a right Downlink (DL) timing offset 201 (hereinafter, referred to as a "timing offset"). Herein, a timing offset indicates an offset from a start point of the received burst to a point at which a right DL signal is received.

A signal transmitted from the transmitter is received by the receiver after passing through a transmit filter of the transmitter, the wireless channel, and the receive filter of the receiver.

To perform frequency offset estimation and channel estimation, sampling instant optimization of the received signal is needed. Due to different communication environment, there is a reception time difference of the transmitted signal between the transmitter and the receiver or between the receiver and another receiver. Especially in the GSM system, timing offset estimation is important for correction of the time difference.

An optimal sampling instant has to be determined as an instant when maximum energy may be included in a channel estimation tap available for channel estimation. That is, the sampling instant has to be determined to use a channel estimation tap capable of including maximum energy available for channel estimation. The sampling instant is determined by a timing offset, and therefore, determination of an optimal timing offset is needed.

SUMMARY

The present disclosure provides a method and apparatus for determining a timing offset in a GSM system.

The present disclosure also provides a method and apparatus for estimating a timing offset that determines a channel estimation tap capable of containing maximum energy available for channel estimation.

The present disclosure also provides a method and apparatus for accurately estimating a timing offset, even when in a situation where two users use the same resource at the same time in a GSM system, for example, in a Voice services over Adaptive Multi-user Channels on One Slot (VAMOS) situation, a signal of one of the users and the other user interferes with each other.

The present disclosure also provides a method and apparatus for estimating a timing offset to determine a channel estimation tap capable of containing maximum energy available for channel estimation in a VAMOS situation in a GSM system.

The present disclosure also provides a method and apparatus for estimating a timing offset that shows effects being similar with those of an optimal timing offset, in spite of low computational intensity, in a VAMOS situation in a GSM system.

According to an aspect of the present disclosure, there is provided a method for estimating a timing offset of a first user in a receiver that supports voice services over adaptive multi-user channels on one slot (VAMOS) allocating two users to one transmission resource and receives a burst through a wireless channel in a mobile communication system, the method including determining a received signal matrix by using multiple reception training symbols that are included in the burst and positioned a predetermined number of symbols later from the timing offset, determining a least square (LS) channel estimation matrix in which the first user and a second user are jointed, by using information of a transmission training symbol allocated to the second user and information of a transmission training symbol allocated to the first user, calculating multiple joint likelihood values by performing inner product with respect to the joint LS channel estimation channel and the received signal matrix, and selecting a timing offset so as to have a maximum value among the multiple joint likelihood values.

According to another aspect of the present disclosure, there is provided a receiving apparatus which supports VAMOS allocating two users to one transmission resource and estimates a timing offset of a first user in a mobile communication system, the receiving apparatus including a transceiver configured to receive a burst through a wireless channel and a timing offset estimator configured to determine a received signal matrix by using multiple reception training symbols that are included in the burst and positioned a predetermined number of symbols later from the timing offset, determine an LS channel estimation matrix in which the first user and a second user are jointed, by using information of a transmission training symbol allocated to the second user and information of a transmission training symbol allocated to the first user, calculate multiple joint likelihood values by performing inner product with respect to the joint LS channel estimation matrix and the received signal matrix, and select a timing offset so as to have a maximum value among the multiple joint likelihood values.

According to another aspect of the present disclosure, there is provided a user equipment (UE) that supporting VAMOS in a mobile communication system, the UE including a transceiver configured to receive a burst through a wireless channel and a controller configured to determine a received signal matrix by using multiple reception training symbols that are included in the burst and positioned a predetermined number of symbols later from the timing offset, determine an LS channel estimation matrix in which the first user and a second user are jointed, by using information of a transmission training symbol allocated to the second user and information of a transmission training symbol allocated to the first user, calculate multiple joint likelihood values by performing inner product with respect to the joint LS channel estimation matrix and the received signal matrix, and select a timing offset so as to have a maximum value among the multiple joint likelihood values.

A method for estimating a timing offset according to an embodiment of the present disclosure does not need to consider channels of two users allocated to the same resource even in a VAMOS situation. Therefore, offset estimation may be performed, showing a result that is similar with an optimal timing offset, while reducing computational complexity.

That is, an estimated timing offset according to an embodiment of the present disclosure has a frame loss rate that is similar with that of an optimal timing offset, such that timing offset estimation that approximates to optimal timing offset estimation may be possible without being burdened with much computation even in a VAMOS situation.

DETAILED DESCRIPTION

Figure 1:
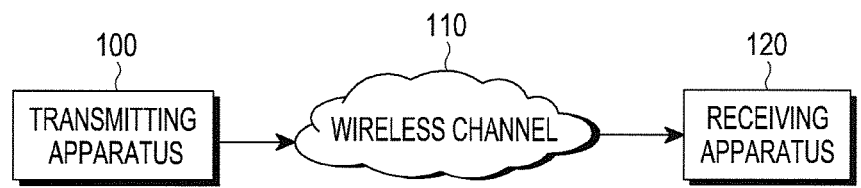
FIG. 1 illustrates a baseband equivalent system model in a mobile communication system.

Hereinafter, exemplary embodiments of the present invention will be described in detail with reference to the accompanying drawings. Moreover, a detailed description of well-known functions or elements associated with the present disclosure will be omitted if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

Before a detailed description of the present disclosure is made, examples of interpretable meanings will be provided for several terms used herein. However, it should be noted that the meanings of the terms are not limited to the examples provided below.

A Base Station (BS) is an entity that communicates with a User Equipment (UE), and may also be referred to as a BS, a NodeB (NB), an eNodeB (eNB), an Access Point (AP), or the like.

The UE is an entity that communicates with the BS, and may also be referred to as a UE, a Mobile Station (MS), a Mobile Equipment (ME), a device, a terminal, or the like.

Hereinbelow, a transmitter (or a transmitting apparatus) is an entity for transmitting a transmission signal, and a receiver (or a receiving apparatus) is an entity for receiving the transmitted signal. Thus, the transmitter may serve as a Base Station (BS) in a Downlink (DL) and as a User Equipment (UE) in an Uplink (UL). Thus, the receiver may serve as a UE in a DL and as a BS in a UL. It should be noticed that the term "user" used in the following detailed description may be interpreted as the same meaning as the term "UE" in a range that does not spoil the intention of the present disclosure.

A description will be made first of timing offset estimation when one user uses one transmission resource, that is, in case of Non-Voice services over Adaptive Multi-user Channels on One Slot (Non-VAMOS).

Estimation of an optimal timing offset for a received signal enables a channel function in the estimated timing offset to express the received signal as similarly as possible to the original received signal. Energy available for channel estimation may be expressed as a joint likelihood function.

Assuming that a term $n_k$ indicating interference and noise in the received signal is a Gaussian random process, a joint likelihood function for a given channel h and a sampling instant τ (: tau) may be given as expressed as below.

$$P(\tilde{y}_{TSC}(\tau) | h, \tau) = \frac{1}{(2\pi\sigma^2)^{N/2}} \exp\left\{-\frac{1}{2\sigma^2} \|\tilde{y}_{TSC}(\tau) - Xh\|^2\right\}$$ [Equation 2]

where a 16×1 vector $\tilde{y}_{TSC}(\tau)$ expresses a de-rotated training signal in a sampling instant τ in the form of a vector by decimating the de-rotated training signal by $N_S$ times, as expressed in Equation 3. Since a transmission signal in the transmitter is transmitted by being phase-rotated according to a modulation scheme and thus de-rotation is needed for restoration, the received signal is the de-rotated signal. Herein, TSC is an abbreviation of a training sequence code, and $\tilde{y}_{TSC}$ indicates a result in a random TSC. σ indicates a variance of a background noise, and N indicates a length of a received signal.

$$\tilde{y}_{TSC}(\tau) = [\tilde{y}_{62N+\tau}, \tilde{y}_{63N+\tau} \ldots \tilde{y}_{77N+\tau}]^T$$ [Equation 3]

A 16×7 convolution matrix X composed of transmission training symbols may be expressed, for example, as follows:

$$X = \begin{bmatrix} x_6 & x_5 & \ldots & x_0 \\ x_7 & x_6 & \ldots & x_1 \\ \vdots & \vdots & \ddots & \\ x_{21} & x_{20} & \ldots & x_{15} \end{bmatrix}$$ [Equation 4]

where $x_i$ indicates a transmission training symbol. By using a maximum likelihood function, a problem of obtaining a channel ĥ and the sampling instant τ̂ that maximize the joint likelihood function may be expressed as follows:

$$\{\hat{h}, \hat{\tau}\} = \arg\min_{h,\tau} \|\tilde{y}_{TSC}(\tau) - Xh\|^2$$ [Equation 5]

where solutions of the channel ĥ and the sampling instant τ̂ may be obtained by:

$$\hat{h}(\tau) = (X^H X)^{-1} X^H \tilde{y}_{TSC}(\tau)$$ [Equation 6]

$$\hat{\tau} = \arg\min_{0 \leq \tau < 7N_s} \|\tilde{y}_{TSC}(\tau) - X\hat{h}(\tau)\|^2$$
$$= \arg\min_{0 \leq \tau < 7N_s} \|\tilde{y}_{TSC}(\tau) - X(X^H X)^{-1} X^H \tilde{y}_{TSC}(\tau)\|^2$$

where $X^H$ indicates a Hermitian matrix of the matrix X.

That is, for a timing offset τ, Least Square (LS) channel estimation $\hat{h}_{LS}(\tau) = (X^H X)^{-1} \tilde{y}_{TSC}(\tau)$ is obtained, and for each timing offset τ in a range of $0 \leq \tau \leq 7N_S$, τ that minimizes a Least Square Error (LSE) $\|\tilde{y}_{TSC}(\tau) - X(X^H X)^{-1} X^H \tilde{y}_{TSC}(\tau)\|^2$ is determined as an optimal timing offset.

The receiver performs 7-tap minimum square channel estimation (LS channel estimation) by using reception training symbols having a length of 16 to estimate a timing offset in a symbol range of −3~+3 with respect to reference timing. For example, the reference timing may be a start point of a fourth symbol (symbol #0) in an LS channel estimation window 220 in FIG. 2.

Figure 2:
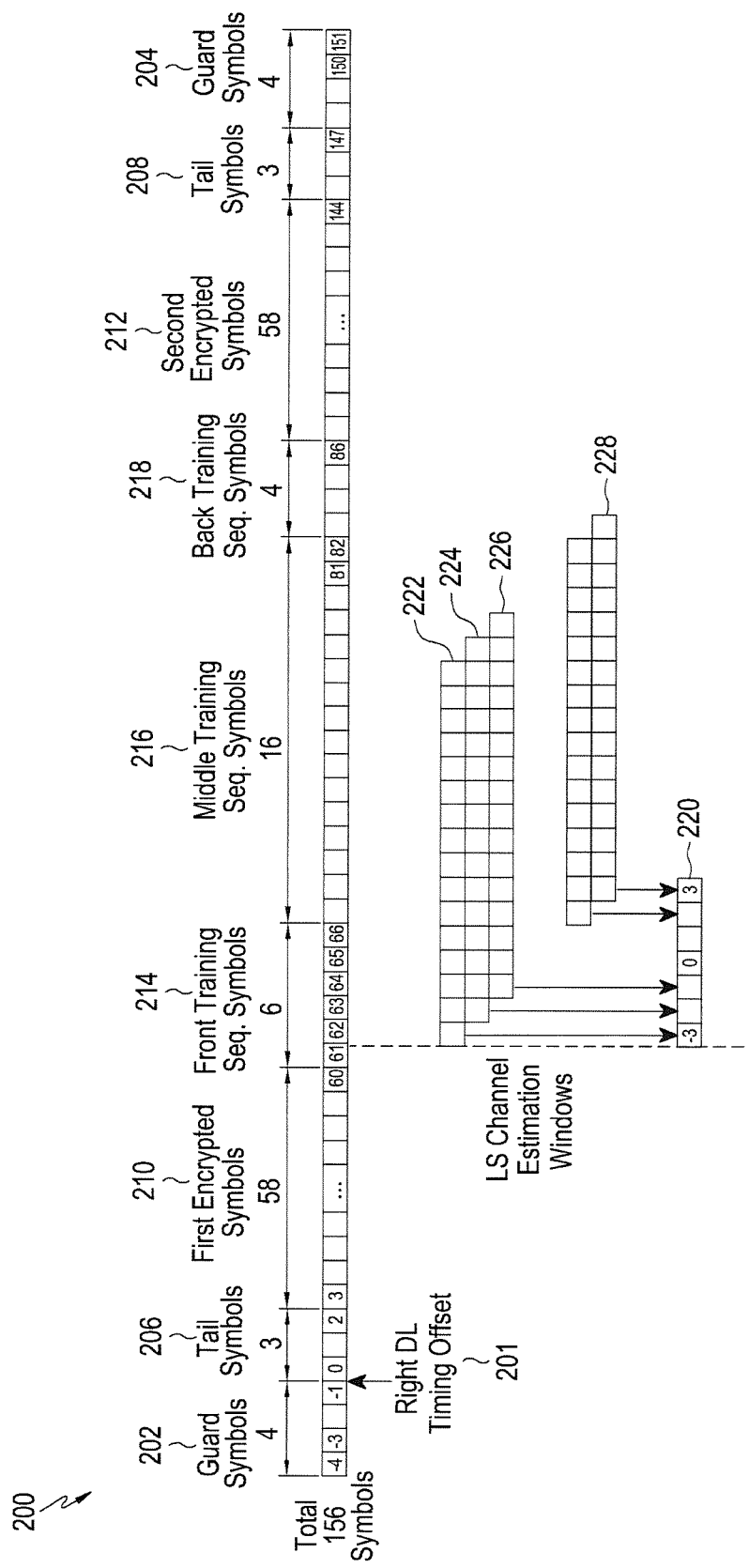
FIG. 2 is a view for describing a burst received by a receiver as the concept of sampling time to describe the concept of timing offset estimation in a GSM system.

Referring to FIG. 2, 7-tap LS channel estimation with respect to the 16 training symbols may be performed with respect to a window 222 from a training symbol #62, a window 224 from a training symbol #63, a window 226 from a training symbol #64, . . . , a window 228 from a training symbol #68. FIG. 2 illustrates a case where the LS channel estimation window 220 having a tap length (i.e., L) of 7 is generated while moving a target window of LS channel estimation to the next.

The 16×7 matrix X is composed of +1 and −1 and thus may be calculated merely using an adder. Because of $(X^H X)^{-1} = 16I$, inverse matrix calculation is not needed. As such, timing offset estimation for Non-VAMOS may obtain an optimal timing offset τ without being burdened with much computation.

Next, a description will be made of timing offset estimation when two users use one transmission resource, that is, in case of VAMOS.

VAMOS is a technique for doubling voice communication capacity by multiple-allocating two voice communication users to an identical physical resource. In a general situation where a coverage or voice quality problem exists, at least 20% of capacity improvement may be expected when VAMOS is used.

A UE may be classified into a basic mode and an advanced mode depending on whether VAMOS is supported or not. In the advanced mode, the UE supporting VAMOS may have improved reception performance when compared to the basic mode.

In the VAMOS basic mode, two users (or UEs) may be multiplexed assuming a UE that does not support VAMOS. For a DL in the VAMOS basic mode, a BS allocates different training sequences to two users for transmission and a UE receives a DL signal by using Gaussian Minimum Shift Keying (GMSK) detection and Single Antenna Interference Cancellation (SAIC). For an UL in the VAMOS basic mode, the two UEs transmit UL signals using training sequences (i.e., different training sequences for the two UEs) that are the same as in case of the DL, and the BS receives the UL signals by using interference cancellation using multiple reception antennas.

In the VAMOS advanced mode, two UEs are multiplexed assuming at least one UE as a VAMOS-support UE. For a DL in the VAMOS advanced mode, the BS allocates an improved (improved when compared to in the VAMOS basic mode) training sequence combination to two UEs and applies transmit power control (TPC) considering improved reception performance of a VAMOS-support UE to transmit a DL signal, and the VAMOS-support UE performs Adaptive Quadrature Phase Shift Keying (AQPSK) sensing and SAIC to receive the DL signal, whereas the non-VAMOS-support UE performs GMSK sensing and SAIC to receive the DL signal. For an UL in the VAMOS advanced mode, the same operation as in the VAMOS basic mode is performed, but because of use of the improved training sequence combination, performance improvement may be achieved when compared to in the VAMOS basic mode.

The improved training sequence Training sequence set II used in the VAMOS advanced mode is designed to maintain an existing training sequence Training sequence set I and a cross correlation low, thereby improving channel estimation performance.

To inform the VAMOS-support UE supporting the VAMOS advanced mode of whether the VAMOS is supported, a VAMOS indicator field may be used. The VAMOS-support UE having received the VAMOS indicator field improves reception performance by using joint channel estimation and AQPSK sensing to be described below.

The AQPSK is a modulation scheme added to simultaneously transmit orthogonal GMSK signals to the two users. Although having a constellation that is similar with QPSK, the AQPSK scheme allows the BS to adjust a power ratio transmitted to the two UEs. According to the AQPSK scheme, the BS transmits a signal to the non-VAMOS-support UE with In-phase/Quadrature (I/Q)-equal power, and the UE may sense its signal based on I/Q orthogonality merely with GMSK sensing. In the AQPSK scheme, the VAMOS-support UE may simultaneously sense its signal and a signal of another user by performing APSK sensing, and may use the sensed signals for reception performance improvement.

For VAMOS, the following matters may be considered.

When VAMOS is supported, the BS needs to simultaneously transmit a DL signal to two users, such that a transmit power per UE may be reduced to a half of a transmit power for a non-VAMOS-support case. Transmit power reduction may cause channel estimation degradation, and downlink performance is degraded when compared to the non-VAMOS-support case due to VAMOS interference caused by channel estimation degradation, and as a result, the DL coverage of the BS may be reduced.

The VAMOS user may be selected considering such a constraint. That is, a user having a high Carrier to Interference Noise Ratio (CINR) may be allocated based on VAMOS, and a user having a low CINR, located at a cell edge, may not be allocated with VAMOS. In this way, the DL coverage of the BS may be maintained.

When the VAMOS is supported, the two users transmit the UL signal at the same time, such that UL coverage reduction may occur due to UL interference level increase. The UL interference level increase causes channel estimation degradation and deteriorates UL performance when compared to the non-VAMOS-support case due to VAMOS interference, resulting in reduction of the UL coverage.

The VAMOS user may be selected considering such a constraint. A user having low interference with another cell and high CINR is allocated according to VAMOS, and a user, which has high interference with another cell and low CINR and is located at a cell edge, is not allocated according to VAMOS. In this way, UL coverage may be maintained.

If two voice communication users are multiple-allocated to an identical physical resource, their signals serve as interference with another user in all reception windows. In particular, in a training sequence window included in a burst received by the receiver, timing offset estimation may not be accurately performed due to interference from another user. In case of high correlation between training sequences like in the VAMOS basic mode, an enhanced timing offset estimation scheme is required to overcome performance degradation for signal detection.

In order for the VAMOS-support receiver to estimate a timing offset, the receiver has to know information of a training sequence code used by the two users allocated with an identical resource. The TSC information is code information of a training sequence (a sequence of a training symbol) allocated to a user, and may be information such as an index of the training sequence code. The TSC information may be delivered to the UE from the BS when the training sequence is allocated, and may be used for timing offset estimation of the VAMOS-support receiver.

Figure 3:
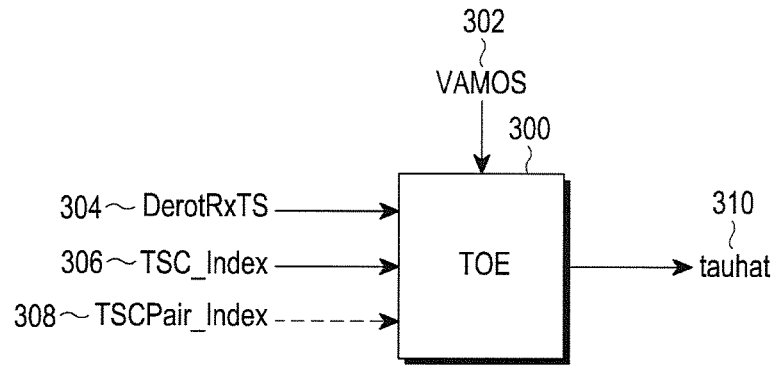
FIG. 3 illustrates an exemplary operation of a timing offset estimator of a VAMOS support receiver according to an embodiment of the present disclosure.

FIG. 3 illustrates an exemplary operation of a timing offset estimator of a VAMOS support receiver according to an embodiment of the present disclosure.

Information input to a timing offset estimator 300 (or a VAMOS TOE block) may include at least one of VAMOS 302, which is flag information indicating whether to apply VAMOS, TSC_index 306, which is TSC index information of a user desiring to estimate a timing offset, and TSCPair_index 308, which is TSC index information of another user allocated to the same resource as for the user. To the timing offset estimator 300 may be further input DeroRxTS 304, which is a signal received from the transmitter (e.g., the BS) through a wireless channel. The DeroRxTS means a de-rotated received TS signal. The timing offset estimator 300 may output an estimated timing offset 310 $\hat{\tau}$ (:tauhat) as a result.

First, a first embodiment will be described in which a timing offset is estimated for VAMOS.

The first embodiment includes a method for estimating an (theoretically) optimal timing offset that maximizes a joint likelihood function for two users allocated to an identical resource for VAMOS.

The joint likelihood function of the received signal for VAMOS may be expressed as follows:

$$P(y(\tau_1, \tau_2) \mid h_1, \tau_1, h_2, \tau_2) = \frac{1}{(2\pi\sigma^2)^{-1/N}} \exp\left\{-\frac{1}{2\sigma^2} \|y(\tau_1, \tau_2) - X_1 h_1 - X_2 h_2\|^2\right\} \quad \text{[Equation 7]}$$

where subscripts "1" and "2" indicate two users (e.g., user #1 and user #2) allocated to an identical resource in case of VAMOS.

Thus, timing offset estimation having a Maximum Likelihood (ML) may be expressed as follows:

$$\{\hat{h}_1, \hat{\tau}_1, \hat{h}_2, \hat{\tau}_2\} = \arg \min_{h_1, \tau_1, h_2, \tau_2} \|y(\tau_1, \tau_2) - X_1 h_1 - X_2 h_2\|^2 \quad \text{[Equation 8]}$$

where solutions of the channel function $\hat{h}$ and the sampling instant $\hat{\tau}$ may be obtained by:

$$X = [X_1 \ X_2] \quad \text{[Equation 9]}$$

$$\hat{h}(\tau) = (X^H X)^{-1} X^H y(\tau_1, \tau_2)$$

$$\{\hat{\tau}_1, \hat{\tau}_2\} = \arg \min_{\substack{0 \le \tau_1 < 7N_s, \\ 0 \le \tau_2 < 7N_s,}} \|y(\tau_1, \tau_2) - (X^H X)^{-1} X^H y(\tau_1, \tau_2)\|^2$$

For optimal timing offset estimation, timing offset estimation for the two users (User #1 and User #2) have to be jointly performed, and for example, if $N_S$ is 4 and a tap length is 7, solutions of $0 \leq \tau_1 < 7*4$ and $0 \leq \tau_2 < 7*4$ have to be calculated, such that the amount of computation increases by 282 times. Such a large amount of computation may make it impossible to implement an optimal solution for a receiver such as a UE.

Second, a second embodiment will be described in which a timing offset is estimated for VAMOS.

In the second embodiment, a user's channel for which a timing offset is to be estimated for VAMOS is obtained by joint least square channel estimation, and a point in which a joint likelihood (that may be expressed as e.g., a Carrier to Interference Ratio (CIR)) calculated based on the obtained channel has the highest value (or a peak value) is estimated as a suboptimum timing offset.

A received signal y of the receiver for VAMOS may be expressed as below:

$$y = X_1 h_1 + X_2 h_2 + n \quad \text{[Equation 10]}$$
$$= [X_1 \ X_2] \begin{bmatrix} h_1 \\ h_2 \end{bmatrix} + n$$
$$= Xh + n$$

$X_1, X_2 : (16 \times 7)$

Taking the channel functions $h_1$ and $h_2$ into account in estimation of a timing offset for any user, a channel environment of a user interferes with the other user, making it difficult to perform timing offset estimation. However, in the second embodiment, instead of considering the channels of the two users separately, the channels are used for estimation as one channel function like in h. When the joint channel function of the two users is used for timing offset estimation, a channel environment of the other user is not regarded as interference in light of the user desiring to estimate a timing offset, and the user may estimate the timing offset without being interfered by the channel of the other user.

Herein, $X_1$ and $X_2$ indicate 16×7 matrices composed of the TSCs of the two users (User #1 and User #2), and have already been known to the two users. X indicates a 16×14 matrix. $h_1$ and $h_2$ are results of 7-tap LS channel estimation with respect to a training symbol and may be 7×1 matrices, respectively, such that h may be a 14×1 matrix. Thus, a received signal matrix y expressed as Xh+n may be a 16×1 matrix.

Then, a joint LS channel estimation matrix y of a user (e.g., User #1) desiring to estimate a timing offset and the other user (e.g., User #2) may be given by:

for $n = 0:N_s - 1$ [Equation 11]

$\hat{h}_1((0:N_s:7N_s - 1) + n) = F_1 y(n)$ end where $F = (X^H X)^{-1} X^H : (14 \times 16)$ $F = \begin{bmatrix} F_1 \\ F_2 \end{bmatrix}, F_1 : (7 \times 16) \ F_2 : (7 \times 16)$ where (a:b:c) is defined as a sequence expressed as (a, a+b, a+2b, . . . , a+$\lfloor$(c−a)/b$\rfloor$b). An operator $\lfloor x \rfloor$ indicates a floor function operator.

The VAMOS-support receiver apparatus may determine an estimated timing offset $\hat{\tau}$ of a user (e.g., User #1) by using y in Equation 10 and the joint LS channel estimation matrix $F_1$ in Equation 11 based on joint Channel Estimation (CE) according to the second embodiment, as expressed in Equation 12.

That is, the receiver apparatus multiplies the received signal y by the joint LS channel estimation matrix, thereby obtaining the channel function $h_1$ of User #1. The joint LS channel estimation matrix may be obtained using TSC information (i.e., TSC_Index and TSCPair_Index) of the two users allocated with an identical physical resource, and the receiver apparatus calculates the joint LS channel estimation matrix in advance and records the calculated joint LS channel estimation matrix in an arbitrary storage unit to search for and use the matrix if necessary.

$$\hat{\tau} = \arg \max_{0 \leq \tau < 7N_s} \sum_r |\hat{h}_1(\tau, r)|^2 \quad \text{[Equation 12]}$$

Equation 12 is a timing offset determination equation and determines a timing offset, which maximizes a peak value of the joint likelihood function, in a range of $0 \leq \tau < 7N_S$. Herein, r indicates an index of an antenna, and $$\sum_r$$

means summation of values of all antennas if there are one or more antennas.

Figure 4:
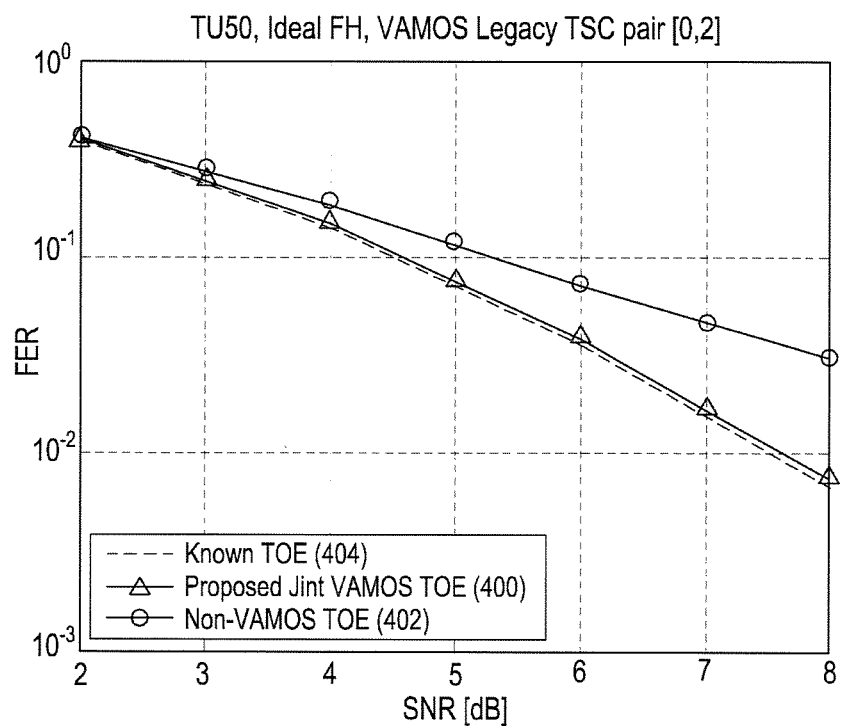
FIG. 4 is a graph showing a frame loss rate of a user with respect to a Signal to Noise Ratio (SNR) when two users are allocated with a training sequence code in a VAMOS situation under ideal frequency conditions.

FIG. 4 is a graph showing a Frame Erasure Rate (FER) of a Traffic Channel (TCH)/Full Rate Speech (FS) of one user with respect to an SNR when a training sequence pair (0, 2) is allocated to the two users for VAMOS under an ideal frequency hopping condition of Typical Urban 50 (TU50, which is a channel profile in an urban environment according to the GSM).

Referring to FIG. 4, a joint VAMOS timing offset estimation scheme 400 according to the second embodiment has superior performance when compared to a timing offset estimation scheme 402 for Non-VAMOS, and shows performance that is close to performance 404 of a scheme (known TOE scheme) assuming that the timing offset is accurately known.

Figure 5:
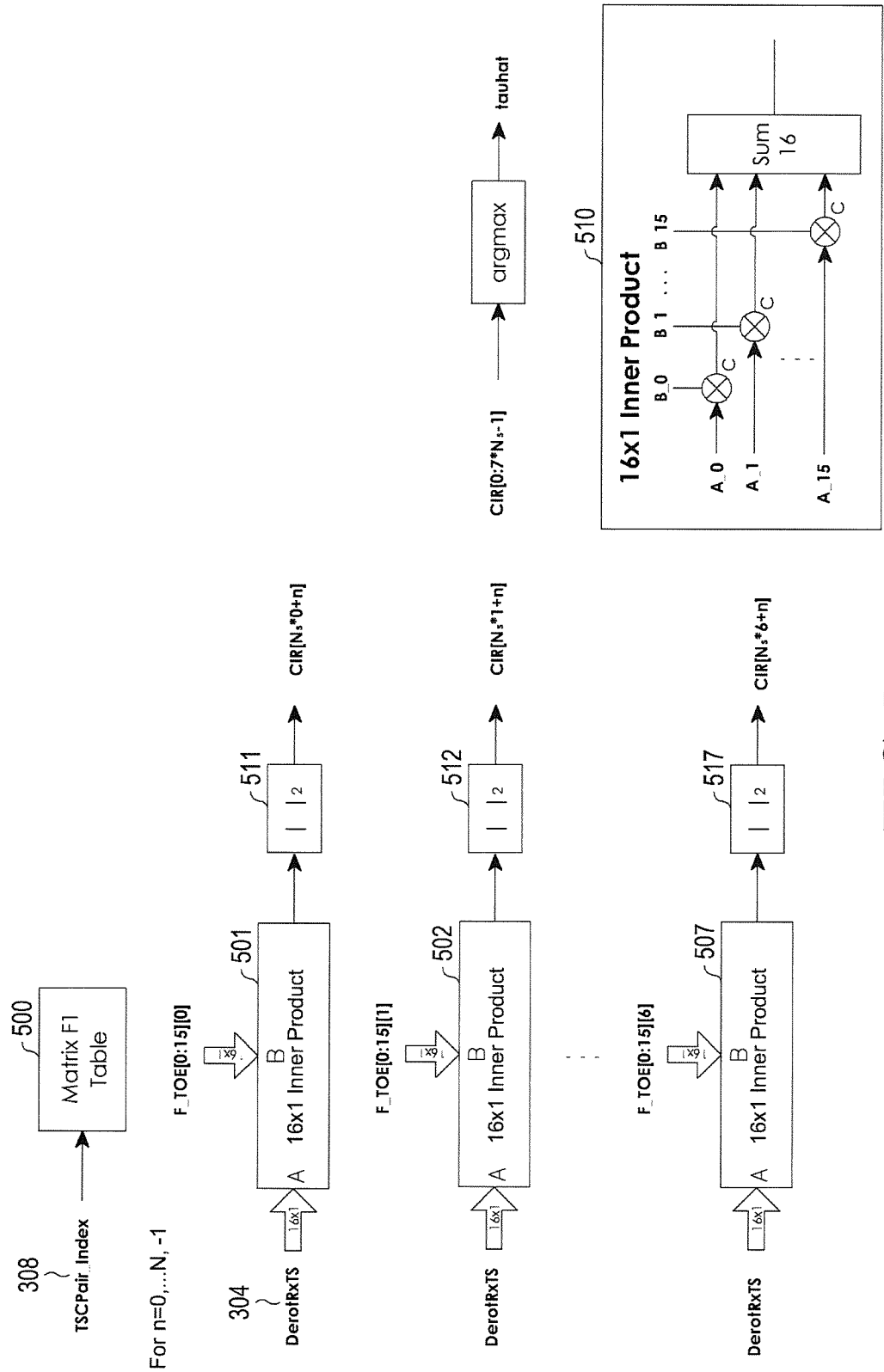
FIG. 5 is a view for describing a timing offset estimation process in a VAMOS situation according to a second embodiment of the present disclosure.

FIG. 5 is a view for describing a timing offset estimation process in a VAMOS situation according to a second embodiment of the present disclosure.

A table 500 of the LS channel estimation matrix $F_1$ is calculated in advance and stored in a storage unit of the receiver apparatus. In information input to the timing offset estimator of the receiver apparatus, TSC index information of the other user allocated with the same resource as the estimation target user, that is, TSCPair_index 308 may be used for calculation of the stored matrix F1 table 500. Alternatively, the matrix F1 table 500 may be calculated for every TSC index supported in VAMOS and stored, and the TSC index information 308 of the other user may be used as a criterion for selecting the joint LS channel estimation matrix $F_1$ used for timing offset estimation.

The calculated (or selected) matrix $F_1$ is a 7×16 matrix, and seven 1×16 partial matrices (F_TOE[0:15][0], F_TOE[0:15][1], (F_TOE[0:15][6]) are sequentially input to seven inner product calculators 501, 502, and 507.

The received signal DeroRxTS 304 input to the timing offset estimator of the receiver apparatus is input to the seven inner product calculators 501, 502, and 507. The received signal DeroRxTS 304 may be multiple training symbols included in a received burst, and when sixteen training symbols are used, a 16×1 matrix y may be used. The sixteen symbols may be consecutive sixteen training symbols positioned a predetermined number of symbols later from a timing offset in the received burst. If the case of FIG. 2 is exemplified, the received signal DerotRxTS 304 may be sixteen consecutive training symbols 62 symbols later (i.e., from a $63^{th}$ symbol) from the timing offset.

Detailed operations of the inner product calculators 501, 502, and 507 are expressed in a block 510. A_0 through A_15 of the block 510 indicate elements of a 16×1 matrix y, and B_0 through B_15 of the block 510 indicate elements of a 1×16 partial matrix of a matrix $F_1$. That is, the inner product calculator multiplies the matrix $F_1$ by the matrix y, and then sums the multiplication result.

Next, absolute value square operations 511, 512, and 517 are performed with respect to seven output values of the inner product calculators 501, 502, and 507, such that joint likelihood values $CIR[N_S*0+n]$, $CIR[N_S*1+n]$, ..., $CIR[N_S*6+n]$ are calculated. A timing offset $\hat{\tau}$ (:tauhat) that maximizes the joint likelihood values may be selected (or determined) as a sub-optimal timing offset.

Selectively, if there are two or more antennas of the receiver, the joint likelihood values of all the antennas of the receiver (in Equation 12, r indicates an antenna index) are summed and the summation result may be determined as the joint likelihood values.

Selectively, the seven joint likelihood values may be repetitively calculated for n=0, ..., $N_S$−1. An oversampling rate $N_S$ indicates the number of samples included in one symbols, such that for example, for $N_S$=4, one symbols may be divided into four sub windows (or sub symbols). Thus, it means that a timing offset may be selected more accurately (i.e., on a sub-symbol basis for estimation) for $N_S$=4 (in comparison to $N_S$=1). Hence, the oversampling rate may be interpreted as a resolution of timing offset estimation. In this case, the timing offset $\hat{\tau}$ (:tauhat) may have a value in a range of 0-7*$N_S$−1 (i.e., $0 \leq \tau < 7N_S$).

Figure 6:
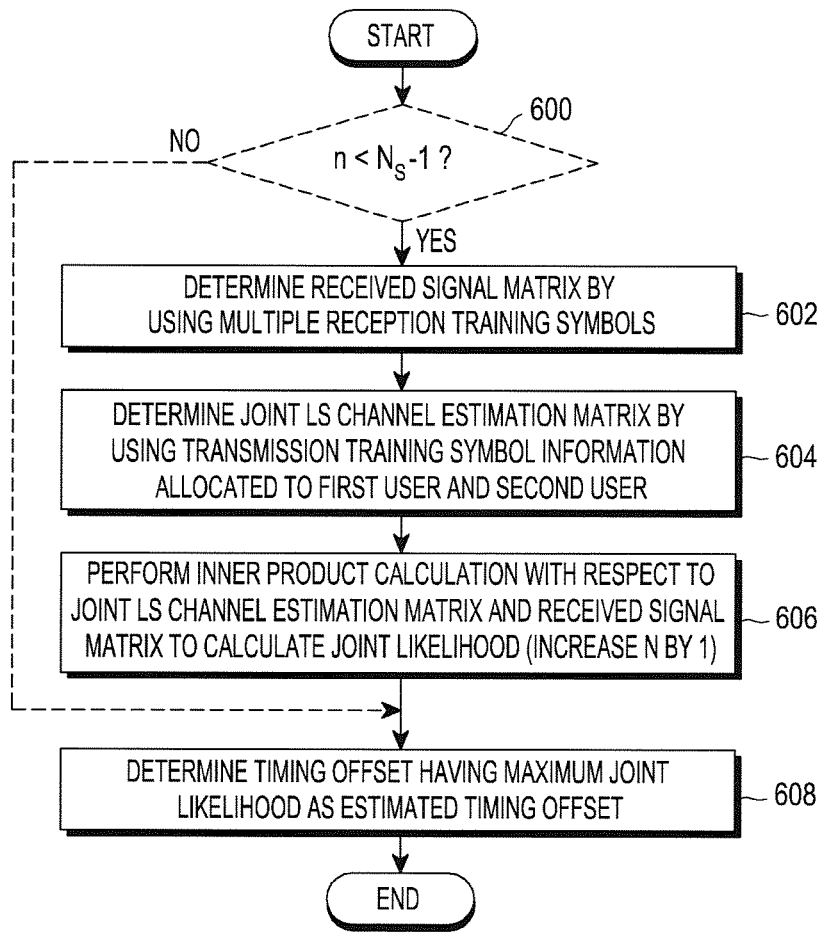
FIG. 6 is a view illustrating a method for estimating a timing offset at a VAMOS-support receiver according to an embodiment of the present disclosure.

FIG. 6 is a view illustrating a method for estimating a timing offset at a VAMOS-support receiver according to an embodiment of the present disclosure.

The VAMOS-support receiver receives a burst transmitted from the transmitter through the wireless channel, and determines multiple reception training symbols positioned a predetermined number of symbols later from a random timing offset in the burst as a matrix y of the received signal in operation 602.

By using information of transmission training symbols allocated to two users allocated with one physical resource, i.e., a first user and a second user, the receiver determines the LS channel estimation channel $F_1$ where the first user and the second user are jointed, in operation 604. Selectively, the joint LS channel estimation matrix $F_1$ may be previously calculated and stored. The information of the transmission training symbol may be index information of a training sequence code.

The receiver performs inner product with respect to the joint LS channel estimation matrix $F_1$ and the matrix y of the received signal to calculate joint likelihood values, in operation 606.

The receiver selects (or determines) a timing offset $\hat{\tau}$ so as to have a maximum value among the calculated multiple likelihood values as an estimated timing offset in operation 608.

Selectively, the multiple joint likelihood values may be calculated for a timing offset value in a range of $0 \leq \tau < 7N_S$, and to this end, operations 602, 604, and 606 may be repeated as many times as $N_S$. For repetition, an operation 600 of checking an $N_S$ value may be further performed, and in this case, an initial $N_S$ value may be set to 0, and an operation of increasing the $N_S$ value by 1 may be further performed in operation 606.

Figure 7:
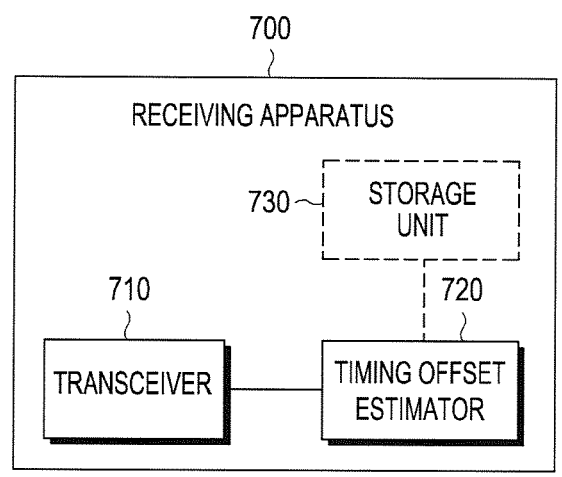
FIG. 7 is a block diagram of a VAMOS-support receiving apparatus according to an embodiment of the present disclosure.

FIG. 7 is a block diagram of a VAMOS-support receiving apparatus according to an embodiment of the present disclosure.

A receiving apparatus 700 may include a transceiver 710 for receiving various signals received from a transmitting apparatus through a wireless channel and a timing offset estimator 720 for performing an overall control operation for timing offset estimation. The receiving apparatus 700 may further include a storage unit 730 for storing a joint LS channel estimation matrix. The timing offset estimator 720 and the storage unit 730 may be configured as one unit like a controller.

The transceiver 710 receives a burst transmitted from the transmitter.

The timing offset estimator 720 performs timing offset estimation operations of the receiving apparatus described in detail in the present disclosure. For example, the timing offset estimator 720 may determine multiple reception training symbols positioned a predetermined number of symbols later from the timing offset in the burst received by the transceiver 710 as a received signal matrix, determine a joint LS channel estimation matrix where two users using an identical physical resource are jointed, by using information of transmission training symbols allocated to the respective two users, perform inner product with respect to the joint LS channel estimation matrix and the received signal matrix to calculate multiple joint likelihood values, and select a timing offset so as to have a maximum value among the multiple joint likelihood values as an estimated timing offset.

The storage unit 730 included additionally stores the joint LS channel estimation matrix that may be calculated in advance by the timing offset estimator 720, and returns the joint LS channel estimation matrix at the request of the timing offset estimator 720.

It should be noted that the diagram for describing operations of the timing offset estimator 720, the exemplary diagram showing timing offset estimation operations, a timing offset estimation procedure diagram, and a block diagram of the receiving apparatus illustrated in FIGS. 3 and 5 through 7 are not intended to limit the scope of the present disclosure. All elements or operations described with reference to FIGS. 3 and 5 through 7 should not be interpreted as an essential element for carrying out the present disclosure, and it may be implemented within a range that does not spoil the gist of the present disclosure even including some elements.

The above described operations may be implemented by including a memory device storing a corresponding program code in an element of a transmitting apparatus, a receiving apparatus, a BS, or a UE. That is, the transmitting apparatus, the receiving apparatus, the BS, or the UE carries out the above described operations by reading and executing the program code stored in the memory device by means of a processor or a Central Processing Unit (CPU).

Various elements or modules of the transmitting apparatus, the receiving apparatus, the BS, or the UE described herein may be operated by using a hardware circuit, for example, a complementary metal oxide semiconductor (CMOS)-based logic circuit, firmware, software, and/or a combination of hardware and the firmware and/or software embedded in a machine readable medium. For example, various electric configurations and methods may be carried out by using electric circuits such as transistors, logic gates, and on-demand semiconductors.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:
1. A method for estimating a timing offset of a first user in a receiver, the method comprising:
receiving, by the first user, a burst through a wireless channel in a mobile communication system;
determining a first matrix indicating training symbols received by the first user, the training symbols being positioned a predetermined number of symbols later from the timing offset in the burst;
determining a second matrix by using information of a first training sequence code allocated to the first user and information of a second training sequence code allocated to a second user;
calculating a function of a channel of the first user by performing inner product with respect to the first matrix and the second matrix;
calculating multiple joint likelihood values with respect to multiple timings by using the function of the channel of the first user; and
determining a timing that maximizes the joint likelihood value as the timing offset, wherein the first user in the receiver supports voice services over adaptive multi-user channels on one slot (VAMOS) allocating two users to one transmission resource,
wherein determining the first matrix, determining the second matrix, calculating the function of the channel of the first user, and calculating the multiple joint likelihood values are repeated as many times as an oversampling rate,
wherein the timing offset is equal to or greater than 0 and is less than a product of a second predetermined number and the oversampling rate, and a unit of the timing offset is a sub-symbol obtained by dividing a symbol by the oversampling rate.
2. The method of claim 1, wherein the information of the first training sequence code allocated to the first user and the information of the second training sequence code allocated to the second user are index information of the first training sequence code and index information of the second training sequence code, respectively.
3. The method of claim 1, wherein the second matrix is stored in advance in a storage of the receiver.
4. The method of claim 1, wherein the receiver is at least one of a base station (BS) or a user equipment (UE).
5. The method of claim 1, wherein the timing offset is determined by:

$$\hat{\tau} = \arg\max_{0 \leq \tau < 7N_s} \sum_r |\hat{h}_1(\tau, r)|^2$$

where $\hat{\tau}$ indicates an estimated timing offset, $N_S$ indicates an oversampling rate, $\Sigma_r|\hat{h}_1(\tau,r)|^2$ indicates a joint likelihood function, r indicates a running index for summation, and $\hat{h}_i$ indicates a function of a channel of the first user.
6. The method of claim 1, wherein determining the second matrix comprises:
obtaining an hermitian matrix of a matrix composed of the information of the first training sequence code and information of the second training sequence code; and
determining the second matrix using at least the hermitian matrix.
7. The method of claim 1, wherein calculating the function of the channel of the first user comprises:
identifying each row of the second matrix as a partial matrices;
performing a multiplication each row of the second matrix and the first matrix; and
performing a summation of each of results of the multiplication.
8. The method of claim 7, wherein determining the timing comprises:
identifying each of results of the summation as the multiple joint likelihood values; and
determining a maximum value among the each result of the summation as the timing offset.
9. A user equipment (UE) comprising:
a transceiver configured to receive a burst through a wireless channel in a mobile communication system; and
a controller configured to
determine a first matrix indicating training symbols received by the UE, the training symbols being positioned a predetermined number of symbols later from a time offset in the burst,
determine a second matrix by using information of a first training sequence code allocated to the UE and information of a second training sequence code allocated to another UE,
calculate a function of a channel of the UE by performing inner product with respect to the first matrix and the second matrix,
calculate multiple joint likelihood values with respect to multiple timings by using the function of the channel of the UE, and
determine a timing that maximizes the joint likelihood value as the timing offset,
wherein the UE supports voice services over adaptive multi-user channels on one slot (VAMOS) in the mobile communication system,
wherein the controller is configured to repeat determine the first matrix, determine the second matrix, calculate the function of the channel of the UE, and calculate the multiple joint likelihood values as many times as an oversampling rate, and
wherein the timing offset is equal to or greater than 0 and is less than a product of a second predetermined number and the oversampling rate, and a unit of the timing offset is a sub-symbol obtained by dividing a symbol by the oversampling rate.
10. The UE of claim 9, wherein the information of the first training sequence code allocated to the UE and the information of the second training sequence code allocated to the UE are index information of the first training sequence code and index information of the second training sequence code, respectively.

11. The UE of claim 9, further comprising a storage configured to store the second matrix that is calculated in advance by the controller.

12. The UE of claim 9, wherein the timing offset is determined by:

$$\hat{\tau} = \arg\max_{0 \leq \tau < 7N_s} \sum_r |\hat{h}_1(\tau, r)|^2$$

where $\hat{\tau}$ indicates an estimated timing offset, $N_S$ indicates an oversampling rate, $\Sigma_r |\hat{h}_1(\tau,r)|^2$ indicates a joint likelihood function, r indicates a running index for summation, and $\hat{h}_l$ indicates a function of a channel of the UE.

13. The UE of claim 9, wherein the controller further configured to:
    obtain an hermitian matrix of a matrix composed of the information of the first training sequence code and information of the second training sequence code; and
    determine the second matrix using at least the hermitian matrix.

14. The UE of claim 9, wherein the controller further configured to:
    identify each row of the second matrix as a partial matrices;
    perform a multiplication each row of the second matrix and the first matrix; and
    perform a summation of each of results of the multiplication.

15. The UE of claim 14, wherein the controller further configured to:
    identify each of results of the summation as the multiple joint likelihood values; and
    determine a maximum value among the each result of the summation as the timing offset.

* * * * *